United States Patent [19]

Asano et al.

[11] Patent Number: 5,627,845

[45] Date of Patent: May 6, 1997

[54] VARIABLE RATE COMMUNICATION METHOD AND A VARIABLE RATE COMMUNICATION SYSTEM

[75] Inventors: Nobuo Asano; Osamu Kato, both of Yokohama, Japan

[73] Assignee: Matsushita Electric Industrial Co., Ltd., Osaka, Japan

[21] Appl. No.: 271,668

[22] Filed: Jul. 7, 1994

[30] Foreign Application Priority Data

Jul. 16, 1993 [JP] Japan .................................. 5-199015

[51] Int. Cl.$^6$ .............................. G06F 11/10; H04J 3/22
[52] U.S. Cl. .............................. 371/43; 371/41; 370/468
[58] Field of Search .................................. 371/43, 44, 45, 371/41; 375/1, 18, 37, 224, 225; 370/84; 341/61

[56] References Cited

U.S. PATENT DOCUMENTS

| | | | |
|---|---|---|---|
| 5,218,619 | 6/1993 | Dent ................................................ | 375/1 |
| 5,280,472 | 1/1994 | Gilhousen et al. ......................... | 370/18 |
| 5,331,666 | 7/1994 | Dent ................................................ | 371/43 |
| 5,341,401 | 8/1994 | Farih et al. ................................. | 371/43 |
| 5,345,452 | 9/1994 | Matui ............................................. | 371/43 |
| 5,461,639 | 10/1995 | Wheatley ................................ | 375/205 |
| 5,566,206 | 10/1996 | Butler et al. ............................ | 375/225 |

OTHER PUBLICATIONS

Allen Salmasi et al., "On The System Design Aspects Of Code Division Multiple Access (CDMA) Applied To Digital Cellular And Personal Communications Networks", May 1991 41st IEEE Vehicular Technology Conference, pp. 57–62.

A.J Viterbi; "Very Low Rate Convolutional Codes for Maximum Theoretical Performance of Spread–Spectrum Multiple Access Channels"; IEEE Journal on Selected Areas In Communications, May 1990.

IEEE Journal of Solid–State Circuits, vol. 28, No. 3, pp. 253–260, Mar. 1993, "CDMA Mobile Station Modem ASIC", Hinderling, et al.

*Primary Examiner*—Paul P. Gordon
*Assistant Examiner*—Brian C. Oakes
*Attorney, Agent, or Firm*—Spencer & Frank

[57] ABSTRACT

In variable bit rate communications in which the information rate changes at $B/2^n$ (where n is 0 or a positive integer) in each frame when the maximum information rate is B, at the transmitter side, information data is convolution coded in order to carry out an error correction of the information data, and when $n \geq 1$, coded data is repeatedly transmitted by $(2^n-1)$ times. At the receiver side, the information rate is detected from the transmission data that has been received, and when carrying out Viterbi decoding, an information rate is estimated by utilizing the repetition characteristics of the data, so that the coded data is Viterbi decoded for only the estimated bit rate, to thereby restrict an increase in the power consumption of mobile terminal units that are driven by batteries.

4 Claims, 6 Drawing Sheets

FIG. 2
PRIOR ART

| | INFORMATION RATE B | INFORMATION RATE B/2 | INFORMATION RATE B/4 |
|---|---|---|---|
| INFOR-MATION DATA | I[0],I[1]······I[m−1] | I[0],I[1]······I[m/2−1] | I[0],I[1]······I[m/4−1] |
| CODED DATA | C[0],C[1]······C[2m−1] | C[0],C[1]······C[m−1] | C[0],C[1]······C[m/2−1] |
| REPETITION | C[0],C[1]······C[2m−1] | C[0],C[0],C[1],C[1]······C[m−1],C[m−1] | C[0],C[0],C[0],C[0],C[1],C[1],C[1],C[1]······C[m/2−1],C[m/2−1],C[m/2−1],C[m/2−1] |
| TRANS-MISSION DATA | T[0],T[1]······T[2m−1] | T[0],T[1],T[2],T[3]······T[2m−2],T[2m−1] | T[0],T[1],T[2],T[3],T[4],T[5],T[6],T[7]······T[2m−4],T[2m−3],T[2m−2],T[2m−1] |

VARIABLE RATE COMMUNICATION METHOD AND A VARIABLE RATE COMMUNICATION SYSTEM

BACKGROUND OF THE INVENTION

1. Field of the Invention

The present invention relates to a method and an apparatus for detecting an information rate of information data in communications in which the information rate is variable.

2. Description of the Related Art

As Allen Salmasi et al. describe in their literature, "On The System Design Aspects Of Code Division Multiple Access (CDMA) Applied To Digital Cellular And Personal Communications Networks (1991 41st IEEE Vehicular Technology Conference)", a variable rate voice CODEC has been used in the CDMA system for the purpose of reducing power consumption of a mobile unit and reducing interference to other mobile units and the base station. The voice CODEC codes and decodes signals in a frame unit, so that an information rate (amount of information) of the coded data changes frame to frame. At the signal receiving side, it is necessary to decode the signal after detecting the information rate. In general, data of voice CODEC is transmitted after an error-correcting coding and other processing.

According to the prior-art mobile unit, a transmitter section provides transmission data having a constant transmission rate by arranging coded data repeatedly by the number corresponding to the current rate. The coded data are formed by convolution coding on the information data coded through the variable rate voice CODEC. A receiver section for receiving the transmitted data can not decode the transmission data correctly if the receiver does not know the exact rate at which the transmitter has coded the information data. Therefore, the receiver section obtains decoded results by Viterbi decoding the received data at every possible information rate, performs convolution coding on each of the decoded results at each corresponding rate again, collates the convolution coded data with the received data, decides the rate used in the convolution coding of the information data by the transmitter section based on the convolution re-coded data which is the most coincident with the received data of the receiver section, and then outputs the decoded result which corresponds to this rate as Viterbi decoded data. A literature, "CDMA Mobile Station Modem ASIC, (IEEE Journal Of Solid-State Circuits, Vol. 28, No. 3, March, 1993)" discloses a method for detecting an information rate according to the method described above.

As described above, the conventional method can detect an information rate in variable rate communications, by Viterbi decoding received data and performing convolution coding on the decoded result again at all potential information rates, and estimating the information rate.

The above-described conventional method for detecting an information rate, however, has problems in that it is necessary to estimate all possible information rates and apply a Viterbi decoding, which is known to require a large change of arithmetic operations, to the respective information rates, so that it is necessary to increase the hardware capacity and increase the circuit operation speed in order to complete the processing within a limited time available, and in that the above requirements lead to an increase in the power consumption at mobile terminal units which are driven by batteries.

SUMMARY OF THE INVENTION

In order to eliminate the above-described problems of the conventional technique, it is an object of the present invention to provide an excellent method and an excellent apparatus for detecting the information rate without carrying out Viterbi decodings corresponding to all information rates.

In order to achieve the above object of the present invention, the information rate is estimated by checking a repeating characteristic of the received data, by taking advantage of characteristics of variable information rate communications in that the same data appear repeatedly in these communications.

Therefore, according to the present invention, the information rate is estimated by utilizing the characteristics that data are repeated, so that, after estimating an information rate, it is necessary to carry out only a Viterbi decoding of this information rate. Accordingly, this method has an effect that an increase in the amount of required processing can be prevented and that an increase in the power consumption can be restricted at the mobile terminal units which are driven by batteries.

BRIEF DESCRIPTION OF THE DRAWINGS

FIG. 2 is a table for explaining the coding operation in the conventional mobile unit at the transmitter side.

DESCRIPTION OF THE PREFERRED EMBODIMENT

At first, a conventional method for transmitting and receiving information data will be explained below with reference to the drawings, to ensure good understanding of the information rate detecting unit according to the present invention.

Figure 1:
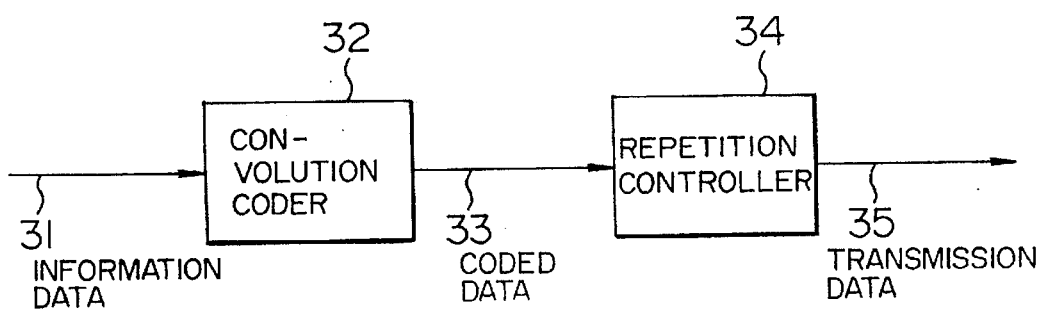
FIG. 1 is a schematic configuration block diagram for showing the conventional mobile unit at the transmitter side.

FIG. 1 is a schematic configuration block diagram of the conventional mobile unit at the transmitter side. Numeral 31 designates information data such as coded data of a voice CODEC having a variable information rate. It is assumed that the information rate changes at $B/2^n$ (where n is a positive integer including 0) when the maximum information rate is B. The information data 31 is coded by a convolution coder 32, and the convolution coder 32 outputs coded data 33. Numeral 34 designates a repetition controller for repeatedly arranging the coded data 33 in order to make constant the transmission rate for transmission data 35.

FIG. 2 shows a table for explaining the coding at the transmitter side. A description will be made of the case for coding one frame when the coding rate of a convolution code is ½ and the information rate is B, B/2 and $B/2^2$ respectively. When the number of data per one frame is m when the information rate is B, the numbers of information data at the information rates B/2 and $B/2^2$ are m/2 and m/4 respectively. When the information data have been convolution coded, the numbers of the data become double. On the other hand, the information rate of the transmission data is determined by the information bit rate B, and the number of data per one frame is 2 m. The repetition controller 34 matches the transmission data to the information rate B, B/2 or B/2$^2$, so that the coded data 33 is repeated by zero times, one time or three times to make the number of data per one frame to become 2 m.

Figure 3:
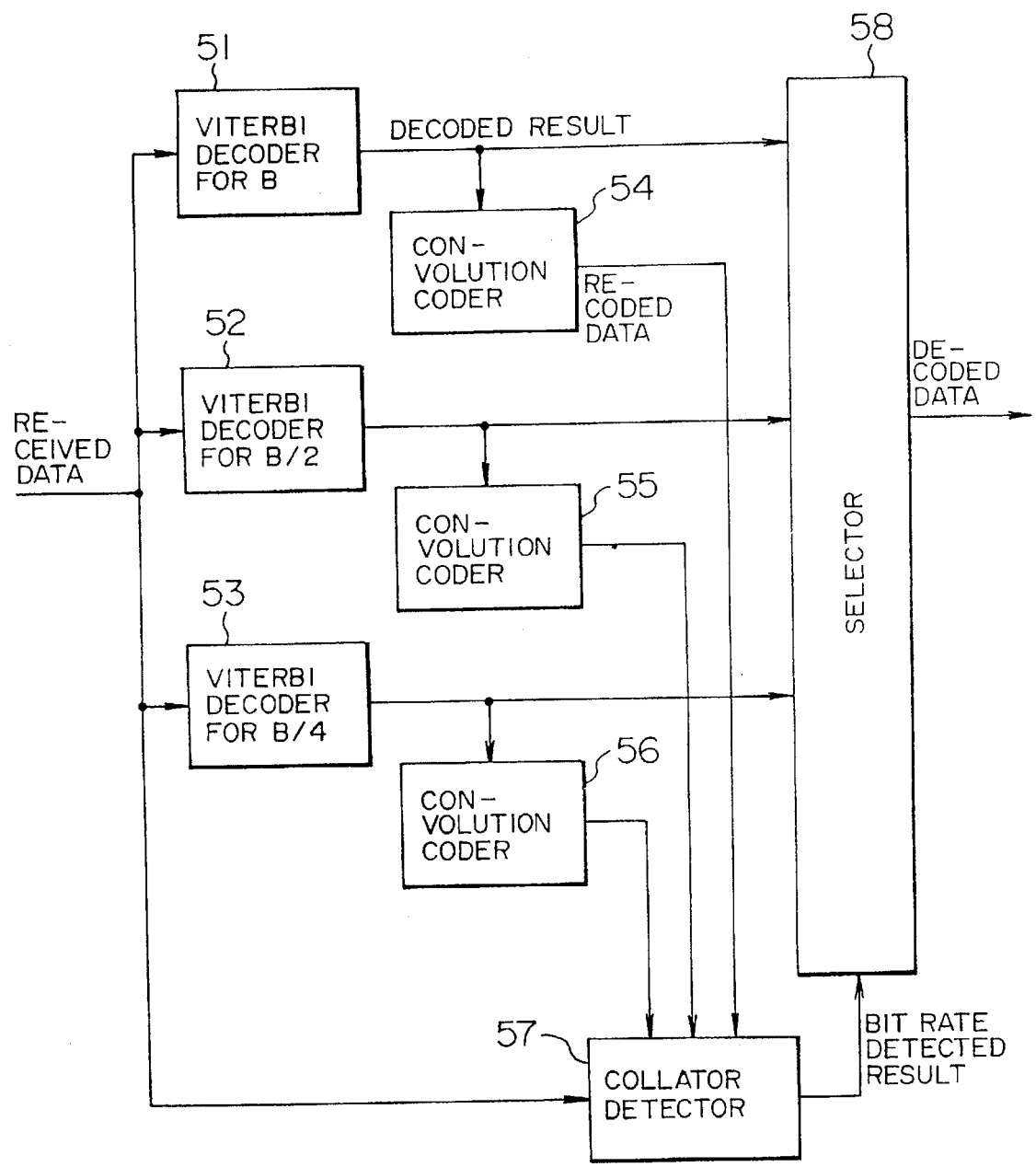
FIG. 3 is a schematic configuration block diagram for showing the conventional decoding and information rate detecting units.

Based on the above assumptions, the conventional method for detecting an information rate at the receiver side will be explained below. FIG. 3 shows the configuration of the conventional information rate detecting unit. In FIG. 3, numeral 51 designates a Viterbi decoder for the information rate B, 52 a Viterbi decoder for the information rate B/2, 53 a Viterbi decoder for the information rate B/4, and 54, 55 and 56 convolution decoders respectively for re-coding the results of decoding of the respective Viterbi decoders. Numeral 57 designates a collator rate detector for collating the re-coded data from the respective convolution coders and detecting an information rate, and 58 a selector for the most likely decoded data based on the result of decoding by the respective Viterbi decoders and the result of information rate detection by the collator rate detector 57.

Figure 4:
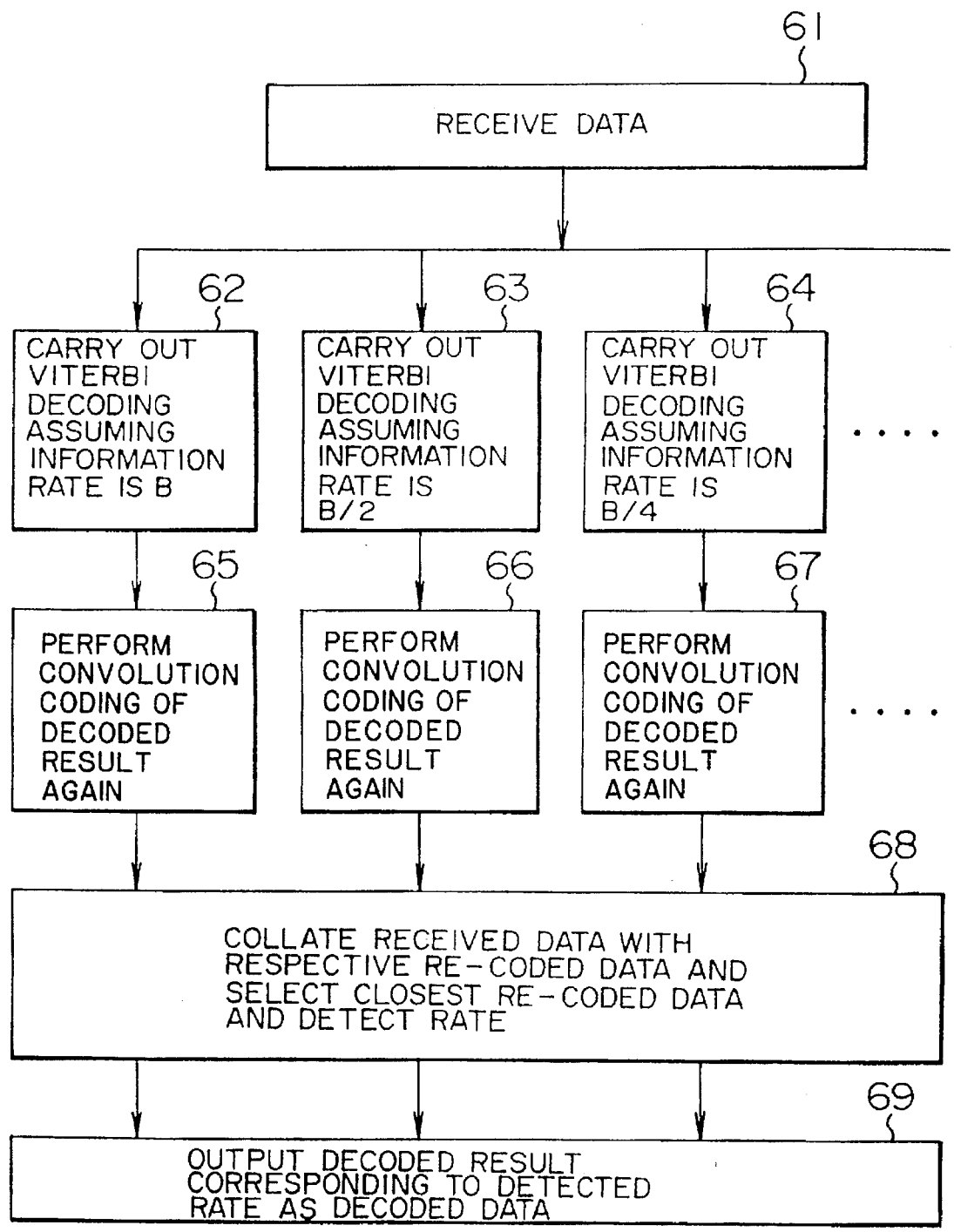
FIG. 4 is a flow chart for showing the conventional method for detecting an information rate.

The operation of the above-described units will be explained below with reference to the flow chart shown in FIG. 4. When data has been received (Step 61), potential information rates are assumed and these information rates are Viterbi decoded by the Viterbi decoders 51, 52 and 53 respectively (Steps 62, 63 and 64). The results of the respective decoding are convolution coded again by the convolution coders 54, 55 and 56 (Steps 65, 66 and 67). The received data are collated with the respective recoded data by the collator rate detector 57, and the most likely information rate is selected and detected (Step 68). The result of the decoding corresponding to this detected information rate is outputted as the Viterbi decoded data (Step 69).

As described above, according to the conventional technique, it is necessary to carry out Viterbi decoding and thus a large number of arithmetic operations for all the potential information rates, and the unit for doing this work requires a large-scale and high-speed circuit for this purpose.

A method and a unit will now be described for detecting the exact information rate actually used in variable rate communications, according to the present invention.

Figure 5:
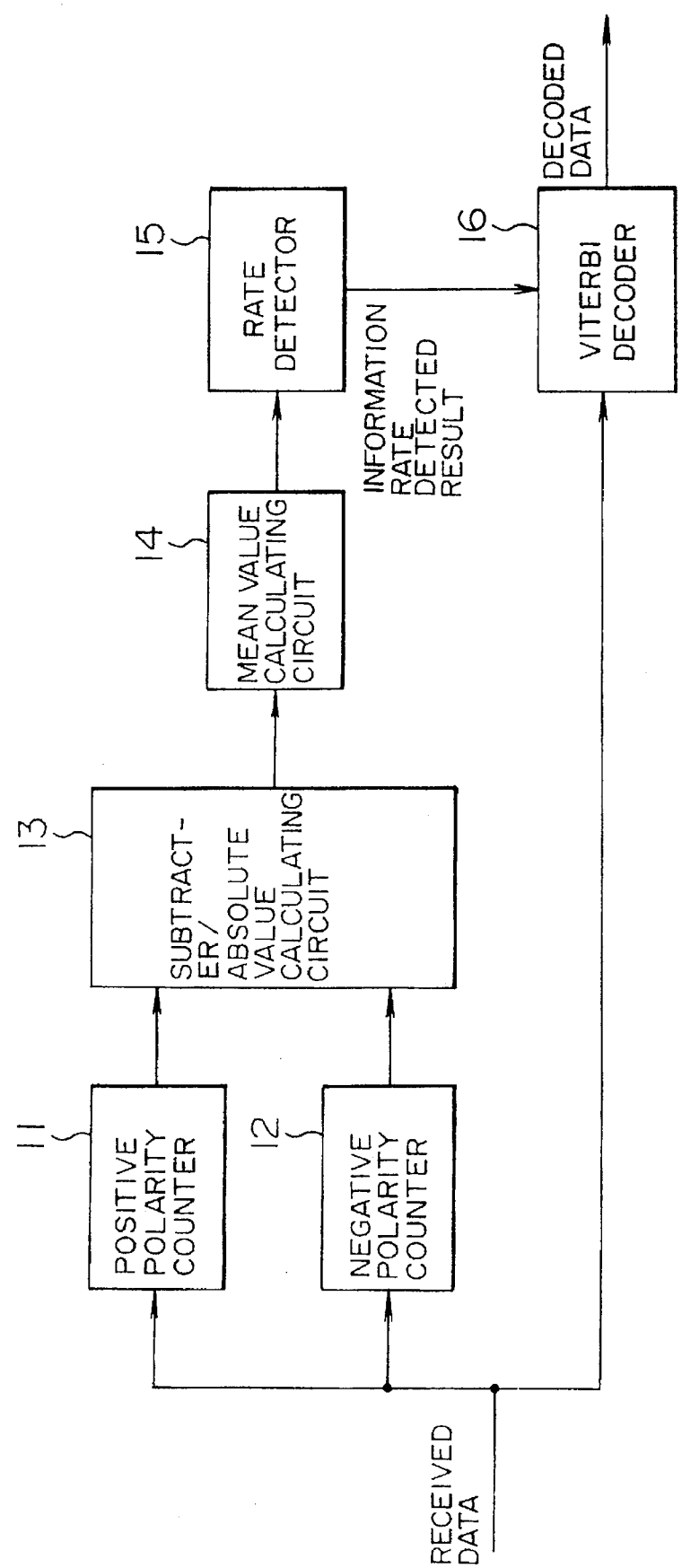
FIG. 5 is a schematic configuration block diagram for showing the decoding and information rate detecting units according to one embodiment of the present invention.

FIG. 5 is a diagram for showing the configuration of the information rate detector in one embodiment of the present invention. The configuration and the assumptions at the transmitter side are similar to those of the conventional technique explained above. In FIG. 5, numeral 11 designates a positive-polarity counter for counting positive-polarity data from received data, and 12 designates a negative-polarity counter for counting negative-polarity data from received data. Numeral 13 designates a subtracter/absolute value calculating circuit for obtaining the absolute value of a difference between counted values counted by the counters 11 and 12. Numeral 14 designates a mean value calculating circuit for obtaining the mean value of the outputs of the subtracter/absolute value circuit 13. Numeral 15 designates an information rate detector for detecting an information rate from the mean values obtained. Numeral 16 designates a Viterbi decoder for Viterbi decoding the received data at the detected information rate.

Figure 6:
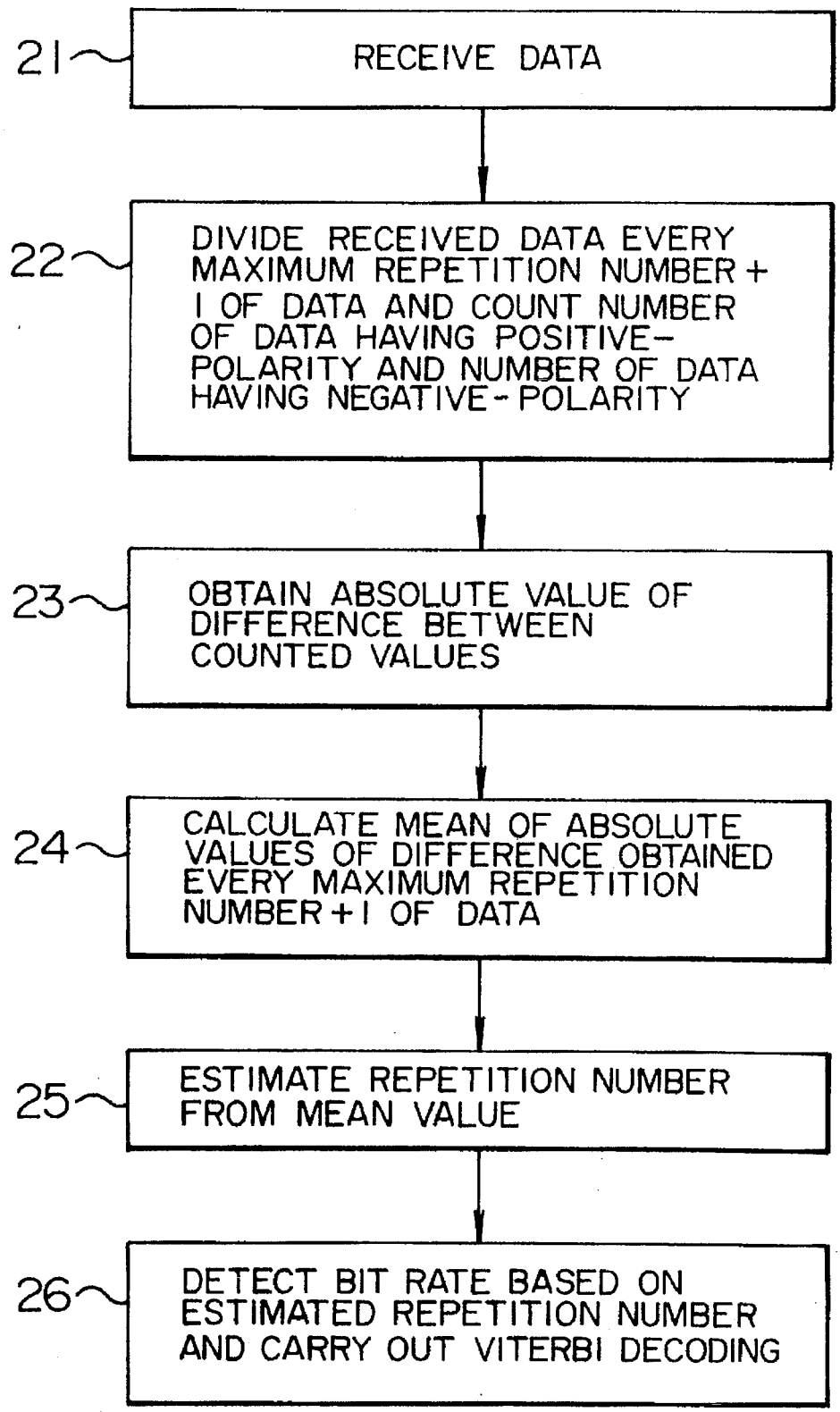
FIG. 6 is a flow chart for showing the operation of the decoding and information rate detecting units according to the above-described embodiment of the present invention.

Next, the operation of the above-described embodiment will be described with reference to the flow chart shown in FIG. 6. At first, data is received for each frame (Step 21). The received data are separated every maximum repetition number +1 of data, and the numbers of positive-polarity data and negative-polarity data included in each set of the separated data are counted by the respective counters 11 and 12 (Step 22). The maximum repetition number in this case is 3 when the information rates used are B, B/2 and B/2$^2$, for example. The absolute value of the difference is obtained from the counter values of the counters 11 and 12 (Step 23). In this case, in a hard detected code, the positive polarity and the negative polarity are defined as 1 and 0 respectively, while in a soft detected code, the positive polarity and the negative polarity are defined as a positive value and a negative value respectively. After the absolute value of the difference is calculated for each set of the maximum repetition number +1 of data, the mean value of the calculated values is obtained (Step 24). The mean value of the absolute value of the difference is compared with each data in the set of the maximum repetition number +1 of data, and the most likely value is assumed to be the repetition number in the corresponding frame (Step 25). When the mean value of the absolute values of the difference between the number of positive-polarity data and the number of negative-polarity data is 2.3, for example, the repetition number is determined to be 1 because this value is closest to 2 among 1, 2 and 4 which are the candidates for the repetition number +1. This can be understood from the following logic. Assume that the actual repetition number is 1 and the same data has been transmitted twice, and in this case, if there has been no bit error in the bits added to the channels, there the following four patterns into which four data can be separated (assuming that the maximum repetition number in this case is 3); (0000), (0011), (1100) and (1111). Thus, the absolute values of the difference between the number of positive-polarity data and the number of negative-polarity data are 4, 0, 0 and 4 respectively, and the mean of these values becomes 2.0. In the present embodiment, the likelihood of a detection is improved when the probability of the occurrence of 0 and 1 is the same in the coded data, which is the information data that has been error-correction coded (C(i) in FIG. 2). Therefore, this method is most suitably applied to the information data or error-correction coded data that have the above-described characteristics, or to scrambled data with a better balance of the probability of the occurrence of 0 and 1, after an error-correction coding. Based on a repetition number that has been obtained in the above-described process, an information rate is determined, and the coded data is Viterbi decoded by the Viterbi decoder 16, to obtain decoded data (Step 26).

As described above, according to the present embodiment, it is possible to detect an information rate of variable rate communications, by utilizing the characteristic that data are repeated.

As is clear from the above-described embodiment, according to the present invention, after an information rate has been estimated based on a repetition of data, the data are Viterbi decoded for only the estimated information rate. Accordingly, an increase in the processing volume can be prevented, with the result being that an increase in the power consumption can be restricted at the mobile terminals that are driven by batteries.

The above-described embodiment shows only one example of the method for detecting an information rate by utilizing the characteristics that data are repeated, and, therefore, it is not necessary to mention that other modified methods for detecting an information rate based on a similar way of consideration can also be applied.

What is claimed is:

1. A variable rate communication method in which a transmitter transmits frames of transmission data and a receiver receives said transmission data, comprising the steps of:

in said transmitter,
- performing convolution coding of the information data for error correction, an information rate of said information data in each frame being represented by any one of B, B/2, B/2$^2$, —B/2$^n$, where B is a maximum information rate of said information data and n is 0 or a positive integer; and
- generating said transmission data by repeating said convolution coded information data in each frame (2$^n$−1) times when the information rate of said information data is B/2$^n$, the number of times that said convolution coded information data is repeated in a given frame being a repetition number for that frame;

and, in said receiver,
- determining the information rate of said information data from said received transmission data by finding the repetition number of said convolution coded information data, for every frame; and
- after the information rate of said information data has been detected, performing Viterbi decoding of said received transmission data based on the detected information rate of said information data, for every frame.

2. A method according to claim 1, wherein said step of determining the information rate in said receiver comprises the steps of:
- dividing said received transmission data into a plurality of data groups every frame, each data group including 2$^n$ units of data;
- counting the number of units of data having a positive polarity and the number of units of data having a negative polarity, for every data group;
- finding the absolute value of the difference between the counted number of units of data having the positive polarity and the counted number of units of data having the negative polarity, for every data group;
- finding the average value of said absolute values, for every frame; and
- estimating the repetition number in each frame based on said average value.

3. A variable rate communication system comprising:
a transmitter for transmitting frames of transmission data and a receiver for receiving said transmission data,
wherein said transmitter includes,
- means for performing convolution coding of the information data for error correction, an information rate of said information data in each frame being represented by any one of B, B/2, B/2$^2$, —B/2$^n$, where B is a maximum information rate of said information data and n is 0 or a positive integer; and
- means for generating said transmission data by repeating said convolution coded information data in each frame (2$^n$−1) times when the information rate of said information data is B/2$^n$ (n is 0 or a positive integer), the number of times that said convolution coded information data is repeated in a given frame being a repetition number for that frame;

wherein said receiver includes,
- means for determining the information rate of said information data from said received transmission data, for every frame; and
- means for performing Viterbi decoding of said received transmission data after said information rate of said information date has been determined, for every frame;

and wherein said determining means includes,
- means for dividing said received transmission data into a plurality of data groups every frame, each data group including 2$^n$ units of data;
- means for counting the number of units of data having a positive polarity and the number of units of data having a negative polarity, for every data group;
- means for finding the absolute value of the difference between the counted number of units of data having the positive polarity and the counted number of units of data having the negative polarity, for every date group;
- means for finding the average value of said absolute values, for every frame;
- means for deciding a most likely repetition number by obtaining zero or a positive integer based on said average value, for every frame; and
- means for finding the information rate of said information data based on said decided most likely repetition number, for every frame.

4. In a variable rate communications system in which a transmitter generates transmission data in frames by performing convolutional coding on information data and selectively repeating the convolutional coded information data based on a repetition number corresponding to a current information rate, the repetition number being zero or 2$^{n-1}$, where n is a positive integer, a receiver for receiving and decoding the transmission data comprising:
- means for determining the repetition number of received transmission data for every frame, said means for determining including,
  - means for counting the number of received units of data having a positive polarity in each of a plurality of data groups,
  - means for counting the number of received units of data having a negative polarity in each of the data groups,
  - means for finding the absolute value of the difference between the number of received units of data having a positive polarity and the number of received units of data having a negative polarity in each of the data groups,
  - means for finding the average of the absolute values, and
  - means for estimating a most likely repetition number based on the average of the absolute values; and
- Viterbi decoding means for performing viterbi decoding of the received transmission data at an information rate corresponding to the repetition number that has been estimated to be most likely.

* * * * *